(12) United States Patent
Yoshimura

(10) Patent No.: US 10,917,622 B2
(45) Date of Patent: Feb. 9, 2021

(54) INFORMATION PROCESSING APPARATUS, DISPLAY CONTROL METHOD, AND STORAGE MEDIUM

(71) Applicant: CANON KABUSHIKI KAISHA, Tokyo (JP)

(72) Inventor: Yuri Yoshimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 16/165,899

(22) Filed: Oct. 19, 2018

(65) Prior Publication Data
US 2019/0124316 A1    Apr. 25, 2019

(30) Foreign Application Priority Data
Oct. 25, 2017    (JP) .................. 2017-206013

(51) Int. Cl.
| | |
|---|---|
| H04N 13/324 | (2018.01) |
| H04N 13/398 | (2018.01) |
| G06T 15/20 | (2011.01) |
| H04N 13/117 | (2018.01) |
| H04N 13/183 | (2018.01) |
| H04N 13/361 | (2018.01) |
| H04N 5/247 | (2006.01) |
| G06T 7/194 | (2017.01) |

(52) U.S. Cl.
CPC ......... *H04N 13/117* (2018.05); *G06T 15/205* (2013.01); *H04N 13/183* (2018.05); *H04N 13/324* (2018.05); *H04N 13/361* (2018.05); *H04N 13/398* (2018.05); *G06T 7/194* (2017.01); *G06T 15/20* (2013.01); *G06T 2207/30221* (2013.01); *H04N 5/247* (2013.01)

(58) Field of Classification Search
CPC ..................................................... H04N 13/117
See application file for complete search history.

(56) References Cited

U.S. PATENT DOCUMENTS

| | | | | |
|---|---|---|---|---|
| 8,694,553 B2 * | 4/2014 | Shuster | ................. | G06T 19/003 707/802 |
| 8,947,511 B2 * | 2/2015 | Friedman | ............. | H04N 13/128 348/51 |
| 8,983,662 B2 * | 3/2015 | Moore | ................. | H04N 9/3194 700/258 |

(Continued)

FOREIGN PATENT DOCUMENTS

JP    2014215828 A    11/2014

*Primary Examiner* — Irfan Habib
(74) *Attorney, Agent, or Firm* — Canon U.S.A., Inc. IP Division

(57) ABSTRACT

An information processing apparatus includes a reception unit configured to receive a designation of a virtual viewpoint relating to a virtual viewpoint image, and a display control unit configured to display a virtual viewpoint image which is generated based on images obtained by shooting an imaging target area from a plurality of directions using a plurality of imaging apparatuses and corresponds to a virtual viewpoint according to the designation received by the reception unit, and information, which specifies a target object included in a range of the field of view of a virtual viewpoint different from the virtual viewpoint according to the designation, on a display unit, wherein the target object is in the imaging target area.

20 Claims, 13 Drawing Sheets

(56) References Cited

U.S. PATENT DOCUMENTS

| | | | |
|---|---|---|---|
| 9,030,522 B2 * | 5/2015 | Hines | H04N 13/194 |
| | | | 348/14.07 |
| 9,092,908 B2 * | 7/2015 | Rapoport | G06T 17/05 |
| 9,521,400 B2 * | 12/2016 | Reicher | G06T 19/006 |
| 9,568,995 B1 * | 2/2017 | Lian | G06T 15/20 |
| 9,602,766 B2 * | 3/2017 | Hines | H04N 21/4788 |
| 9,818,230 B2 * | 11/2017 | Moravetz | G02B 27/0179 |
| 9,838,506 B1 * | 12/2017 | Cronin | A63F 13/63 |
| 9,961,259 B2 * | 5/2018 | Murasumi | H04N 5/23238 |
| 9,986,207 B2 * | 5/2018 | Cronin | H04N 7/183 |
| 10,019,054 B2 * | 7/2018 | Lian | G06F 3/012 |
| 10,235,010 B2 * | 3/2019 | Funakoshi | H04S 7/30 |
| 10,295,338 B2 * | 5/2019 | Abovitz | G02B 27/017 |
| 10,356,215 B1 * | 7/2019 | Cronin | H04L 67/38 |
| 10,431,061 B2 * | 10/2019 | Tovey | G08B 13/19682 |
| 10,474,711 B1 * | 11/2019 | Cronin | A63F 13/358 |
| 2010/0245573 A1 * | 9/2010 | Gomi | H04N 7/181 |
| | | | 348/148 |
| 2011/0301760 A1 * | 12/2011 | Shuster | G06T 19/003 |
| | | | 700/264 |
| 2012/0099804 A1 * | 4/2012 | Aguilera | G06T 19/003 |
| | | | 382/285 |
| 2013/0063549 A1 * | 3/2013 | Schnyder | H04N 13/264 |
| | | | 348/36 |
| 2013/0246182 A1 * | 9/2013 | Bradley | G06Q 30/0267 |
| | | | 705/14.64 |
| 2014/0306886 A1 * | 10/2014 | Hanawa | A63F 13/525 |
| | | | 345/156 |
| 2016/0035136 A1 * | 2/2016 | Sendai | G06F 3/012 |
| | | | 345/633 |

\* cited by examiner

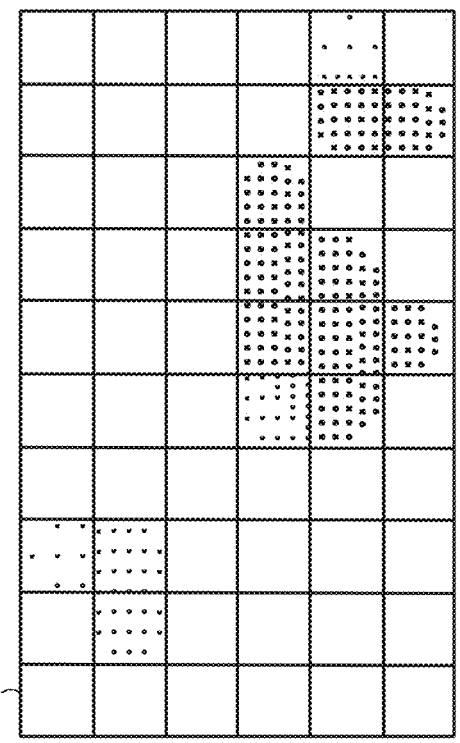

INFORMATION PROCESSING APPARATUS, DISPLAY CONTROL METHOD, AND STORAGE MEDIUM

BACKGROUND

Field of the Disclosure

The present disclosure relates to a virtual viewpoint image.

Description of the Related Art

There is a technique for synchronously capturing images on a multi-viewpoint basis by using a plurality of imaging apparatuses installed at different positions and, by using a plurality of images obtained in this image capturing, generating not only images captured at the installation positions of the imaging apparatuses but also a virtual viewpoint image which can be obtained by arbitrarily changing the viewpoint.

The virtual viewpoint image is generated by an image processing unit such as a server, which consolidates images captured by a plurality of cameras, generates a three-dimensional model, and performs processing such as rendering on the model. The generated virtual viewpoint image is then transmitted to a user terminal to be viewed.

Japanese Patent Application Laid-Open No. 2014-215828 discusses a technique for generating and displaying the virtual viewpoint image corresponding to an arbitrary viewpoint setting by using images in an identical range captured by a plurality of imaging apparatuses arranged to surround the identical range.

For example, if a virtual viewpoint image according to a user-set viewpoint is generated from captured images of a sporting event, a user can watch a game from a desired viewpoint. However, a user unfamiliar with virtual viewpoint setting may hardly know a viewpoint at which he or she should watch a viewing target (such as a sporting event) in order to generate a realistic virtual viewpoint image. In addition, a user unfamiliar with virtual viewpoint setting is unable to recognize the position of a virtual viewpoint which enables shooting of a remarkable event or object viewed by many other users. Therefore, such a user may possibly miss the remarkable event or object. A viewing target according to a virtual viewpoint image is not limited to a sporting event, and a similar problem may occur in a concert and other events.

SUMMARY

According to an aspect of the present disclosure, an information processing apparatus includes a reception unit configured to receive a designation of a virtual viewpoint relating to a virtual viewpoint image, and a display control unit configured to display a virtual viewpoint image which is generated based on images obtained by shooting an imaging target area from a plurality of directions using a plurality of imaging apparatuses and corresponds to a virtual viewpoint according to the designation received by the reception unit, and information, which specifies a target object included in a range of the field of view of a virtual viewpoint different from the virtual viewpoint according to the designation, on a display unit, wherein the target object is in the imaging target area.

Further features of the present disclosure will become apparent from the following description of exemplary embodiments with reference to the attached drawings.

BRIEF DESCRIPTION OF THE DRAWINGS

FIGS. 5A and 5B illustrate other examples of the virtual camera visualization information.

DESCRIPTION OF THE EMBODIMENTS

An exemplary embodiment of the present disclosure will be described in detail below with reference to the accompanying drawings. However, the present disclosure is not limited to the following exemplary embodiment but can be modified in diverse ways within the ambit of the appended claims.

(Image Processing System)

Figure 1:
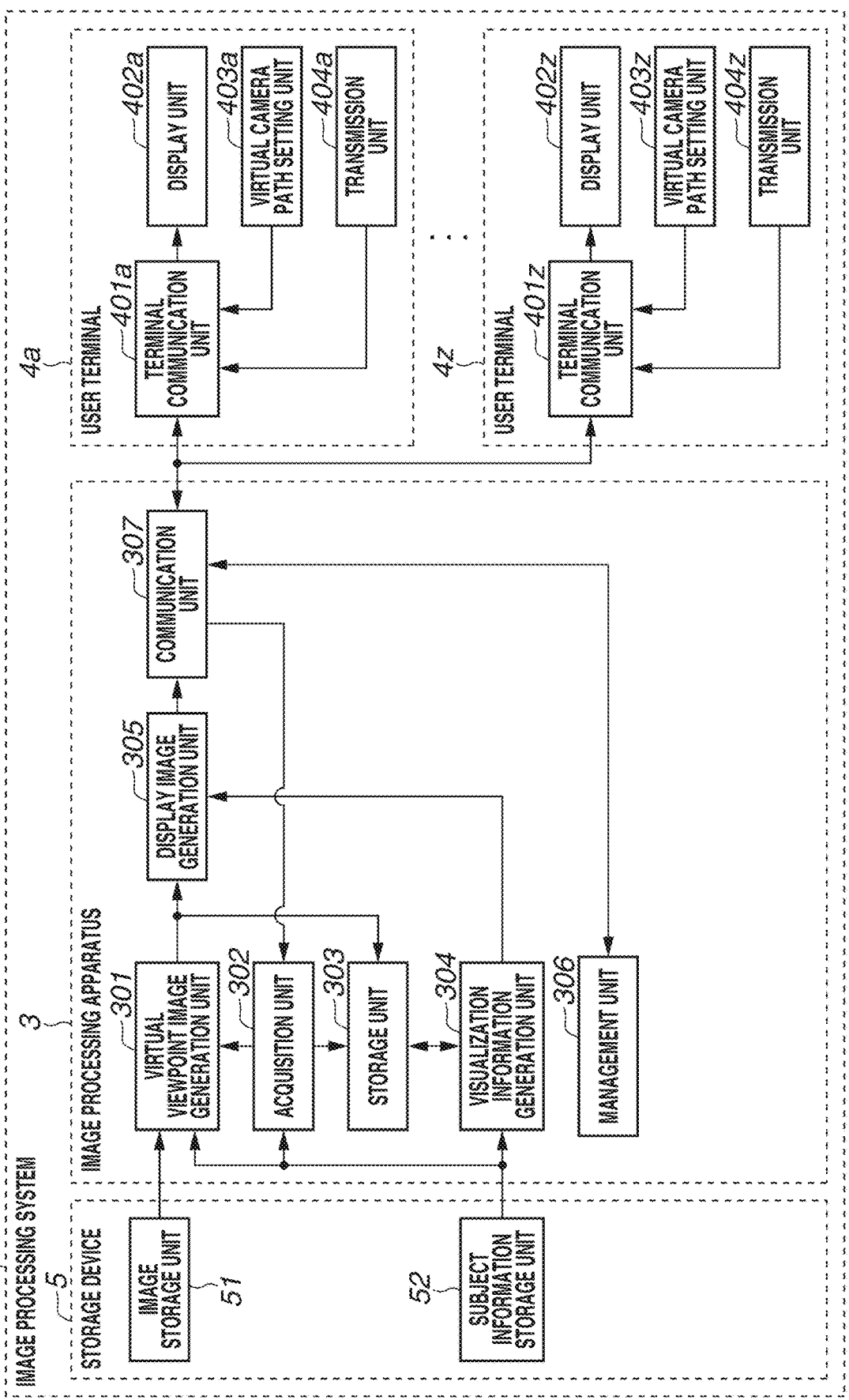
FIG. 1 illustrates a configuration of an image processing system.

An exemplary embodiment will be described below with reference to the accompanying drawings. FIG. 1 schematically illustrates an example of an image processing system according to the present exemplary embodiment. An image processing system 100 illustrated in FIG. 1 is a system for generating a virtual viewpoint image by using images captured by a plurality of cameras installed on a field where a game is actually performed, and on a stadium or concert hall holding spectators' seats. A virtual viewpoint image is an image generated by using a plurality of images captured at a plurality of viewpoints, and represents a shooting result of a virtual image at an arbitrary viewpoint or arbitrary line-of-sight direction. The image processing system 100 includes an image processing apparatus 3, user terminals 4a to 4z, and a storage device 5.

The storage device 5 is an apparatus for storing various information including a plurality of images and imaging targets shot by a plurality of cameras installed in the stadium, and information about the stadium and field which are spaces and also to be shot. The image processing apparatus 3 is an information processing apparatus for generating information for visualizing viewpoints according to virtual viewpoint images set by a plurality of users and generating virtual viewpoint images. The image processing apparatus 3 generates a virtual viewpoint image representing the shooting result of the virtual image based on the position of a determined viewpoint. The image processing apparatus 3 may also generate a virtual viewpoint image representing an image shooting result when a virtual camera is oriented in a determined line-of-sight direction. The image processing apparatus 3 generates a virtual viewpoint image by using a plurality of images captured by a plurality of cameras and accumulated in the storage device 5. The image processing apparatus 3 transmits the generated virtual viewpoint image to any of the user terminals 4a to 4z.

Each of the user terminals 4a to 4z displays the virtual viewpoint image received from the image processing apparatus 3 on the display screen provided on the user terminals 4a to 4z. The user terminals 4a to 4z also receives, for example, an instruction for setting and moving the position of a viewpoint related to a virtual viewpoint image, an instruction for setting and changing the line-of-sight direction related to a virtual viewpoint image, and an instruction for switching the viewpoint based on a user's input. Then, the user terminals 4a to 4z transmit as virtual viewpoint information a transmission signal indicating the contents of the instruction to the image processing apparatus 3. Unless specifically noted, 26 user terminals (the user terminals 4a to 4z) are collectively referred to as a user terminal 4, and components of the user terminal 4 will be described below without distinction between the user terminals 4a to 4z. Although the number of user terminals is 26, the number is only an example and is not limited thereto. Unless otherwise noted, in the present exemplary embodiment, the word image indicates concepts of both a moving image and a still image. More specifically, the image processing system 100 according to the present exemplary embodiment is capable of processing both still images and moving images.

Figure 11:
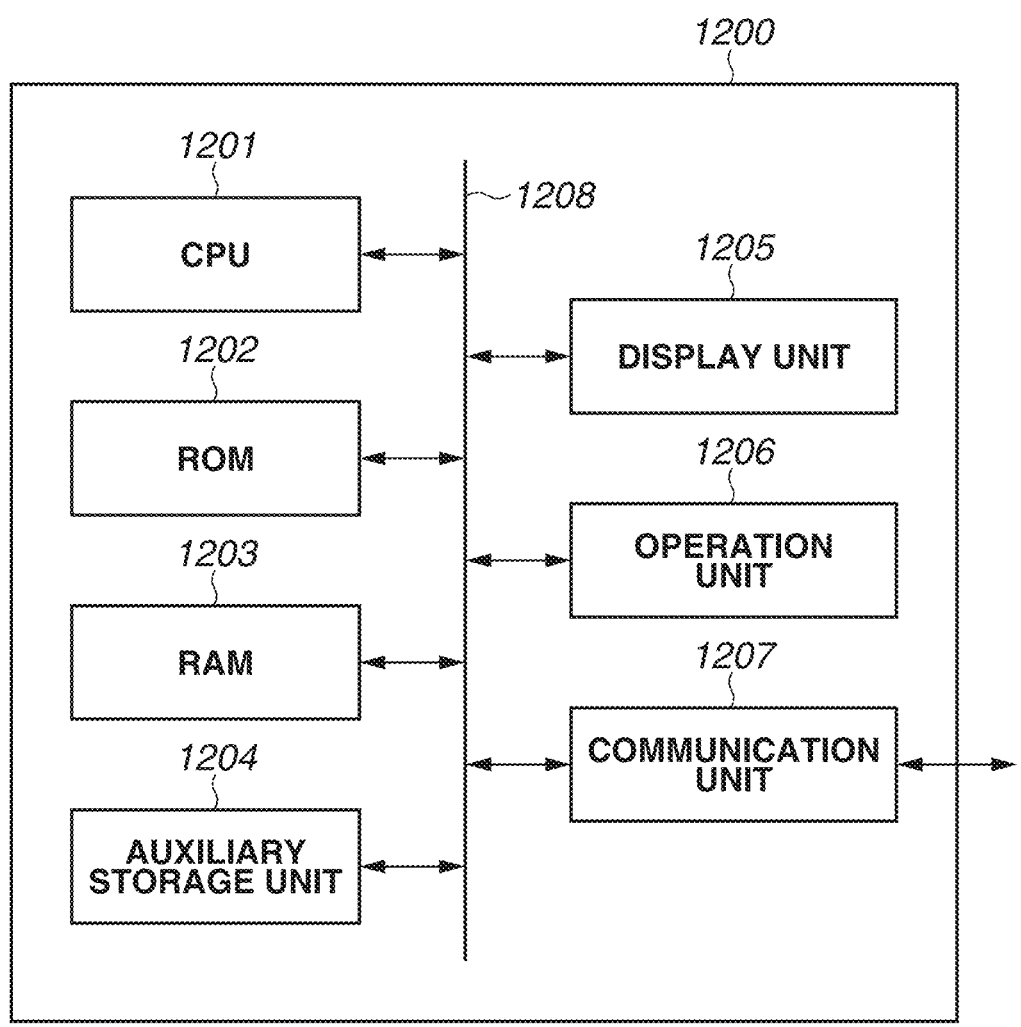
FIG. 11 illustrates a hardware configuration of each apparatus of the image processing system.

An example of a hardware configuration of each apparatus (the image processing apparatus 3, the user terminals 4a to 4z, and the storage device 5) in the image processing system 100 will be described below with reference to FIG. 11. An apparatus 1200 includes a central processing unit (CPU) 1201, a read only memory (ROM) 1202, a random access memory (RAM) 1203, an auxiliary storage device 1204, a display unit 1205, an operation unit 1206, a communication unit 1207, and a bus 1208.

The CPU 1201 controls the entire apparatus 1200 by using computer programs and data stored in the ROM 1202 and RAM 1203. The ROM 1202 stores programs and parameters which do not need to be changed. The RAM 1203 temporarily stores programs and data supplied from the auxiliary storage device 1204 and data supplied from the outside via the communication unit 1207. The auxiliary storage device 1204 including a hard disk drive stores content data such as still images and moving images.

The display unit 1205 including a liquid crystal display (LCD) displays a graphical user interface (GUI) used by the user to operate the apparatus 1200. The operation unit 1206 including a keyboard and a mouse receives user instructions and outputs various instructions to the CPU 1201. The communication unit 1207 communicates with an external apparatus. For example, when the apparatus 1200 is connected via wired communication with an external apparatus, a local area network (LAN) cable is connected to the communication unit 1207. When the apparatus 1200 has a function of wirelessly communicating with an external apparatus, the communication unit 1207 has an antenna. The bus 1208 connects the above-described components of the apparatus 1200 and transmits information therebetween.

Although, in the present exemplary embodiment, the display unit 1205 and the operation unit 1206 are included in the apparatus 1200, the apparatus 1200 does not need to include at least one of the display unit 1205 and the operation unit 1206. In addition, at least one of the display unit 1205 and the operation unit 1206 may exist outside the apparatus 1200 as a separate apparatus, and the CPU 1201 may operate as a display control unit for controlling the display unit 1205 and as an operation control unit for controlling the operation unit 1206.

The CPU 1201 may be composed of a single CPU or a plurality of CPUs, or may be a multi-core CPU. Instead of the CPU 1201 or together with the CPU 1201, the apparatus 1200 may include a hardware component such as an application specific integrated circuit (ASIC), field programmable gate array (FPGA), or graphics processing unit (GPU). In this case, a hardware component such as an ASIC, FPGA, or GPU may perform part or all of processing to be executed by the CPU 1201. Part of the processing of the apparatus 1200 may be implemented by hardware, and another part of the processing may be implemented through software processing carried out by the CPU 1201. Not all of the apparatuses of the image processing system 100 need to have a configuration similar to the above. Each individual apparatus may lack a part of the configuration or may have other configurations.

The functional configuration of each apparatus of the image processing system 100 will be described below with reference to FIG. 1. The functional configuration of each device illustrated in FIG. 1 is implemented when the CPU 1201 of each device executes a computer program stored in the ROM 1202 or RAM 1203 to control information calculations and each hardware component. Part or all of each configuration illustrated in FIG. 1 may be implemented by a dedicated hardware component. The dedicated hardware component is, for example, an ASIC, FPGA, or GPU.

A configuration of the storage device 5 will be described below. The storage device 5 includes an image storage unit 51 and a subject information storage unit 52. The image storage unit 51 stores a plurality of images synchronously captured by a plurality of cameras installed surrounding a game field. The image storage unit 51 may store captured images having undergone foreground and background separation processing. In the foreground background separation processing, the area of a predetermined object (hereinafter referred to as a foreground object) as a ball or a specific person such as a player may be extracted as a foreground area from an image, and the remaining image (the image other than the foreground area extracted) may be a background area. The image indicating the foreground area is also called a foreground image, and the image indicating the foreground area is also called a background image. The subject information storage unit 52 stores information about spaces to be shot. The subject information storage unit 52 stores three-dimensional model information of an object (background object) projected as a background onto virtual viewpoint image, such as the field and spectators' seats of the stadium which are an imaging target, and three-dimensional space information of a range where virtual viewpoints can be set. Part or all of the above-described functional configurations of the storage device 5 may be included in the image processing apparatus 3 or the user terminal 4.

A configuration of the image processing apparatus 3 will be described below. The image processing apparatus 3 includes a virtual viewpoint image generation unit 301, an acquisition unit 302, a storage unit 303, a visualization information generation unit 304, a display image generation unit 305, a management unit 306, and a communication unit 307. The virtual viewpoint image generation unit 301 generates a virtual viewpoint image based on a plurality of images acquired from the image storage unit 51. The virtual viewpoint image generation unit 301 may generate a three-dimensional model based on a plurality of images acquired from the image storage unit 51 and generate a virtual viewpoint image through model base rendering for mapping a texture from the viewpoint related to a virtual viewpoint image acquired from the acquisition unit 302. Model base rendering utilizes a three-dimensional shape (model) of a target obtained through a three-dimensional shape restoration technique such as a volume intersection method and MULTI-VIEW-STEREO (MVS). Model base rendering is a technique for generating an image captured by a virtual camera at a viewpoint according to a virtual viewpoint image by using the generated three-dimensional shape. A virtual viewpoint image may be generated by using other methods such as image base rendering. Image base rendering is a rendering method for generating a virtual viewpoint image based on images captured at a plurality of viewpoints without performing modeling (a process for generating an object shape by using geometric figures).

The virtual viewpoint image generation unit 301 calculates the coordinates of the foreground and background objects projected onto a virtual viewpoint image to be generated and performs texture mapping and rendering for the coordinates. The virtual viewpoint image generation unit 301 stores the coordinate values related to the foreground object as the foreground coordinates and stores the coordinate value related to the background object as the background coordinates in the storage unit 303 (described below).

The acquisition unit 302 acquires the viewpoint position and/or line-of-sight direction related to the virtual viewpoint image to be generated. In the present exemplary embodiment a virtual camera for capturing and generating the virtual viewpoint image is used, and setting of the viewpoint position and/or line-of-sight direction related to a virtual viewpoint image to be generated is also called setting of the position and orientation of the virtual camera. A continuous transition of the position and orientation of a virtual camera is called a virtual camera path. More specifically, the image processing apparatus 3 can generate a plurality of the virtual viewpoint images based on the set virtual camera path. The image processing apparatus 3 can also generate as one moving image a plurality of the virtual viewpoint images generated based on the set virtual camera path.

When the virtual viewpoint information based on a user's operation is acquired from the user terminal 4, the acquisition unit 302 determines the position and direction corresponding to the virtual viewpoint information as the viewpoint position and line-of-sight direction, respectively, related to the virtual viewpoint image to be output. The virtual viewpoint information includes at least position information and direction information.

Based on the contents of a user instruction, the acquisition unit 302 acquires the position and orientation of a virtual camera related to a temporally continuous virtual camera path or a still image. The acquisition unit 302 identifies a virtual camera path by setting virtual camera parameters. The virtual camera parameters include the position and/or direction of a virtual camera related to the frame number or time code. The acquisition unit 302 may set the angle of view, focal length, or zoom magnification of a virtual camera as virtual camera parameters. The acquisition unit 302 refers to the subject space information acquired from the subject information storage unit 52 and sets a virtual camera path in the range where virtual viewpoints can be set.

The storage unit 303 accumulates the foreground and the background coordinates received from the virtual viewpoint image generation unit 301 and the virtual camera path parameters calculated by the acquisition unit 302 in association with user information acquired from the management unit 306 (described below).

To visualize information about virtual cameras set by a plurality of users accumulated in the storage unit 303 so that the user can comprehensively and intuitively recognize and grasp the information, the visualization information generation unit 304 generates graphic data or text data. Processing for visualizing virtual camera information will be described in detail below.

The display image generation unit 305 generates display images to be produced on the display unit 402 of the user terminal 4. Display images generated in this case include a virtual viewpoint image generated by the virtual viewpoint image generation unit 301 and information based on a result of the generation of virtual camera visualization information generated by the visualization information generation unit 304.

The display image generation unit 305 may generate the virtual viewpoint images generated by the virtual viewpoint image generation unit 301 and the virtual camera visualization information generated by the visualization information generation unit 304 as data which can be displayed on the user terminal 4 as it is. The display image generation unit 305 may also generate a new image by overlapping these pieces of information. The display image generation unit 305 may also generate a display image by adding further information to the virtual viewpoint images generated by the virtual viewpoint image generation unit 301, and a result of visualizing the virtual camera information generated by the visualization information generation unit 304. Examples of the information to be added by the display image generation unit 305 may include text data indicating the name of a player of an imaging target sporting event and graphic data indicating the locus of a ball. Examples of the information to be added by the display image generation unit 305 may also include various information such as interface-displayed data for receiving a predetermined input from the user. The display image generation unit 305 generates a display image in the final state to be transmitted to the user terminal 4.

The management unit 306 receives user information including the user identifier (ID) for identifying each user, account information related to each user, and attribute information of each user from the user terminal 4 via the communication unit 307 and stores the user information. The user information may be acquired from an apparatus different from the user terminal 4. The management unit 306 may manage images and various information including the virtual viewpoint information for camera path setting transferred between the image processing apparatus 3 and the user terminal 4, in association with the user information. The communication unit 307 transmits and receives various information including image, sound, and text data and instructions for virtual camera path setting, to/from the user terminal 4 via a network (not illustrated).

A configuration of the user terminal 4 will be described below. The user terminal 4 includes a terminal communication unit 401, a display unit 402, a virtual camera path setting unit 403, and a transmission unit 404. The terminal communication unit 401 transmits and receives various information to/from the image processing apparatus 3. The display unit 402 displays various information including information received from the image processing apparatus 3. The virtual camera path setting unit 403 receives an instruction for a virtual camera path from the user and transmits the virtual viewpoint information for setting a virtual camera path based on the instruction to the image processing apparatus 3 via the terminal communication unit 401. In addition, the virtual camera path setting unit 403 may be configured to, upon reception of an instruction such as "view a portion where a target event is occurring", calculate and acquire the position coordinates and light-of-sight direction related to a virtual viewpoint image based on the instruction. The virtual camera path setting unit 403 may also be configured to, upon reception of an instruction such as "view a virtual viewpoint image targeting a specific player", calculate and acquire the position coordinates and light-of-sight direction related to a virtual viewpoint image based on the instruction. The virtual camera path setting unit 403 may also be configured to, upon reception of an instruction such as "view a fixed range of a ball", calculate and acquire the position coordinates and light-of-sight direction related to a virtual viewpoint image based on the instruction.

The transmission unit 404 transmits user information including the user ID for identifying each user, account information related to each user, and attribute information of each user to the image processing apparatus 3 via the terminal communication unit 401.

A configuration of the image processing system 100 illustrated in FIG. 1 is only an example. The image processing system 100 may have another apparatus having a part of the above-described components. The image processing apparatus 3 may be composed of a plurality of apparatuses.

Figure 12:
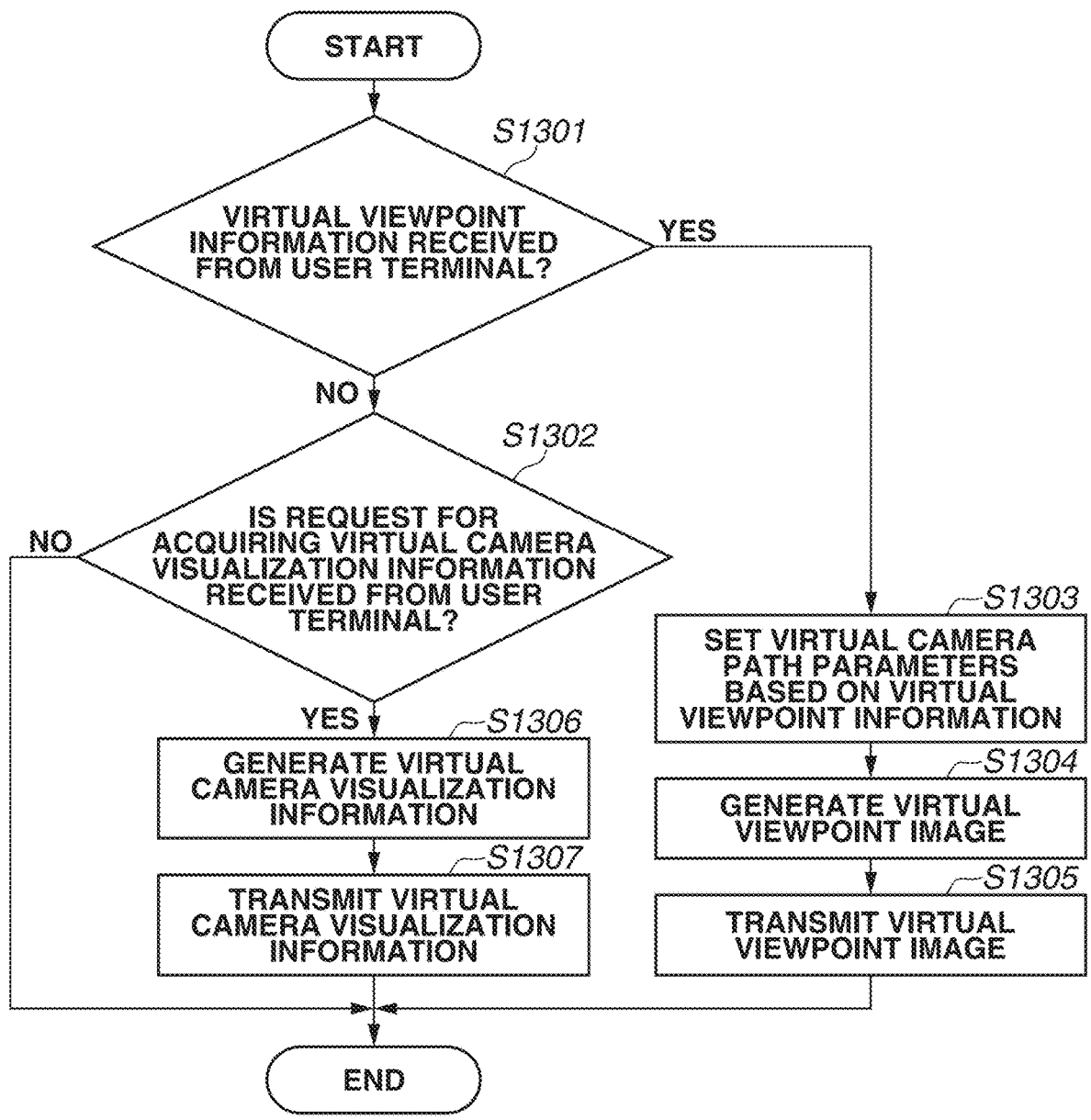
FIG. 12 is a flowchart illustrating flow of processing of an image processing apparatus.

Operations of the image processing system 100 having the above-described configuration will be described below. First, operations of the image processing apparatus 3 will be described below with reference to the flowchart illustrated in FIG. 12. Processing in the flowchart illustrated in FIG. 12 is started when the image processing apparatus 3 receives information from the user terminal 4. Processing in flowcharts (described below) is implemented when the CPU 1201 of the image processing apparatus 3 executes a program to control information calculations and each hardware component. In addition, at least a part of steps in flowcharts (described below) may be executed by a dedicated hardware component. The dedicated hardware component is, for example, an ASIC, FPGA, and GPU.

In step S1301, the image processing apparatus 3 determines whether information received from the user terminal 4 is the virtual viewpoint information for identifying the position and orientation of a virtual camera. When the image processing apparatus 3 does not determine that the information received from the user terminal 4 is the virtual viewpoint information (NO in step S1301), then in step S1302, the image processing apparatus 3 determines whether the information received from the user terminal 4 is a request for acquiring the virtual camera visualization information. When the image processing apparatus 3 does not determine that the information received from the user terminal 4 is a request for acquiring the virtual camera visualization information (NO in step S1302), the image processing apparatus 3 ends the processing. The image processing apparatus 3 may also be configured to perform processing according to the acquired information.

On the other hand, when the image processing apparatus 3 determines that the information received from the user terminal 4 is the virtual viewpoint information (YES in step S1301), then in step S1303, the image processing apparatus 3 sets the virtual camera path parameters based on the received virtual viewpoint information. The image processing apparatus 3 sets imaging time related to the virtual viewpoint image to be generated, and the viewpoint position and/or line-of-sight direction to be associated with the images. The image processing apparatus 3 may set temporally continuous virtual camera path parameters and set parameters related to the viewpoint position and/or line-of-sight direction related to the virtual viewpoint image as a still image.

In step S1304, the image processing apparatus 3 generates a virtual viewpoint image according to the set virtual camera path parameters. In step S1304, as described above, the image processing apparatus 3 generates a three-dimensional model by using images captured by a plurality of cameras and performs processing such as rendering on the model to generate a virtual viewpoint image. In step S1305, the image processing apparatus 3 transmits the generated virtual viewpoint image to the user terminal 4.

On the other hand, when the image processing apparatus 3 determines that the information received from the user terminal 4 is a request for acquiring the virtual camera visualization information (YES in step S1302), the processing proceeds to step S1306. The processing in step S1306 will be described in detail below. In step S1307, the image processing apparatus 3 transmits the generated virtual camera visualization information to the user terminal 4.

Figure 13:
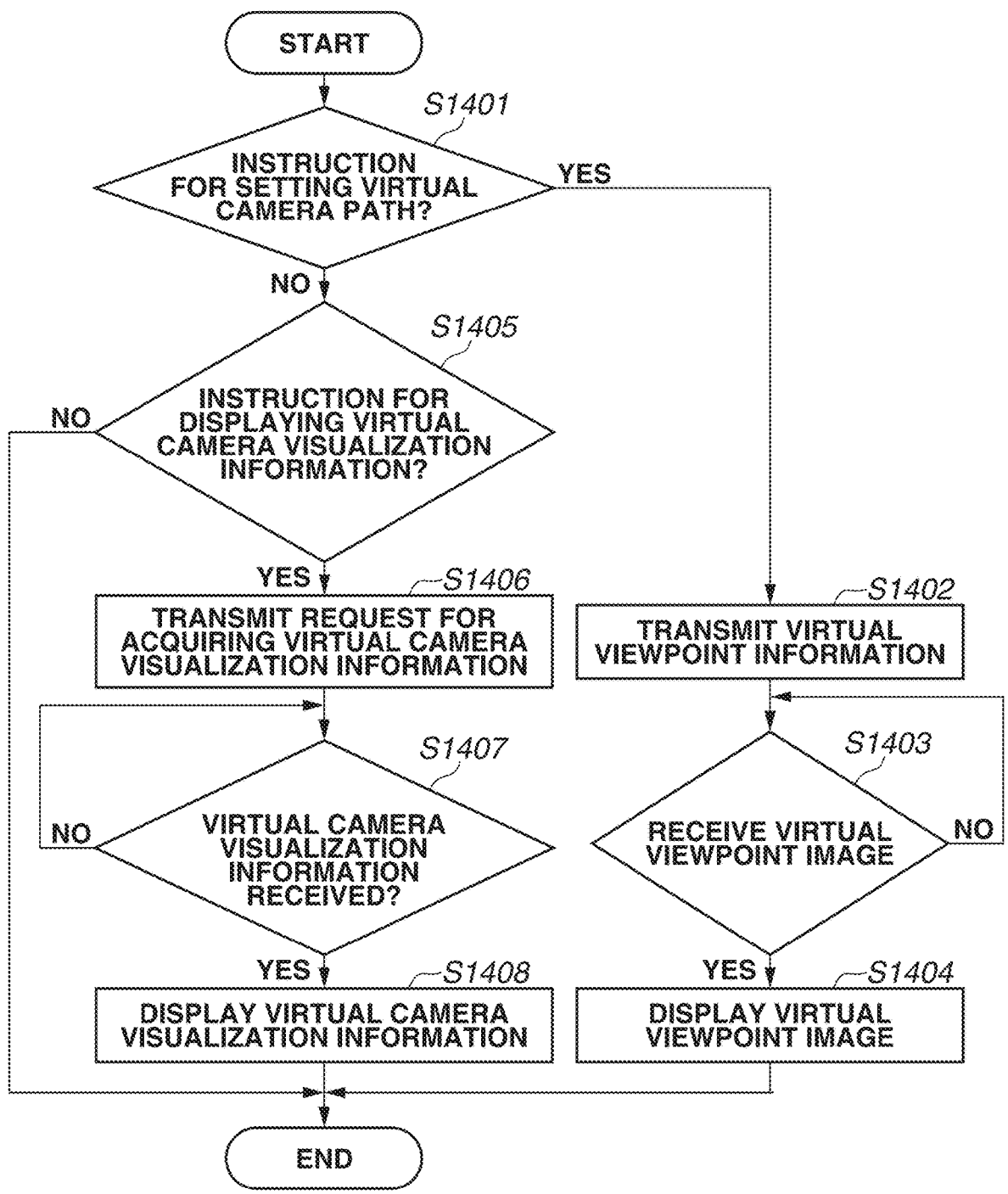
FIG. 13 is a flowchart illustrating a flow of processing of the user terminal.

Operations of the user terminal 4 will be described below with reference to the flowchart illustrated in FIG. 13. Processing in the flowchart illustrated in FIG. 13 is started when the user terminal 4 receives an instructing operation from the user. Processing in flowcharts (described below) is implemented when the CPU 1201 of the user terminal 4 executes a program to control information calculations and each hardware component. In addition, at least a part of steps in flowcharts (described below) may be executed by a dedicated hardware component. The dedicated hardware component is, for example, an ASIC, FPGA, and GPU.

In step S1401, the user terminal 4 determines whether the instructing operation received from the user is an instruction for setting a virtual camera path. When the user terminal 4 does not determine that the instructing operation received from the user is an instruction for setting a virtual camera path (NO in step S1401), then in step S1405, the user terminal 4 determines whether the instructing operation received from the user is an instruction for displaying the virtual camera visualization information. When the user terminal 4 does not determine that the instructing operation received from the user is an instruction for displaying the virtual camera visualization information (NO in step S1405), the user terminal 4 ends the processing. The user terminal 4 may also be configured to perform processing according to the received instructing operation.

On the other hand, when the user terminal 4 determines that the instructing operation received from the user is an instruction for setting a virtual camera path (YES in step S1401), then in step S1402, the user terminal 4 transmits to the image processing apparatus 3 the virtual viewpoint information for identifying the virtual camera path based on an instructing operation received from the user. In step S1403, the user terminal 4 determines whether a virtual viewpoint image based on the transmitted virtual viewpoint information is received from the image processing apparatus 3. When the user terminal 4 determines that a virtual viewpoint image is received from the image processing apparatus 3 (YES in step S1403), then in step S1404, the user terminal 4 displays the received virtual viewpoint image.

On the other hand, when the user terminal 4 determines that the instructing operation received from the user is an instruction for displaying the virtual camera visualization information (YES in step S1405), then in step S1406, the user terminal 4 transmits a request for acquiring the virtual camera visualization information to the image processing apparatus 3. After transmitting a request for acquiring the virtual camera visualization information, then in step S1407, the user terminal 4 determines whether the virtual camera visualization information is received from the image processing apparatus 3. When the user terminal 4 determines that the virtual camera visualization information is received from the image processing apparatus 3 (YES in step S1407), then in step S1408, the user terminal 4 displays the received virtual camera visualization information.

(Processing for Generating Virtual Camera Visualization Information)

Figure 2:
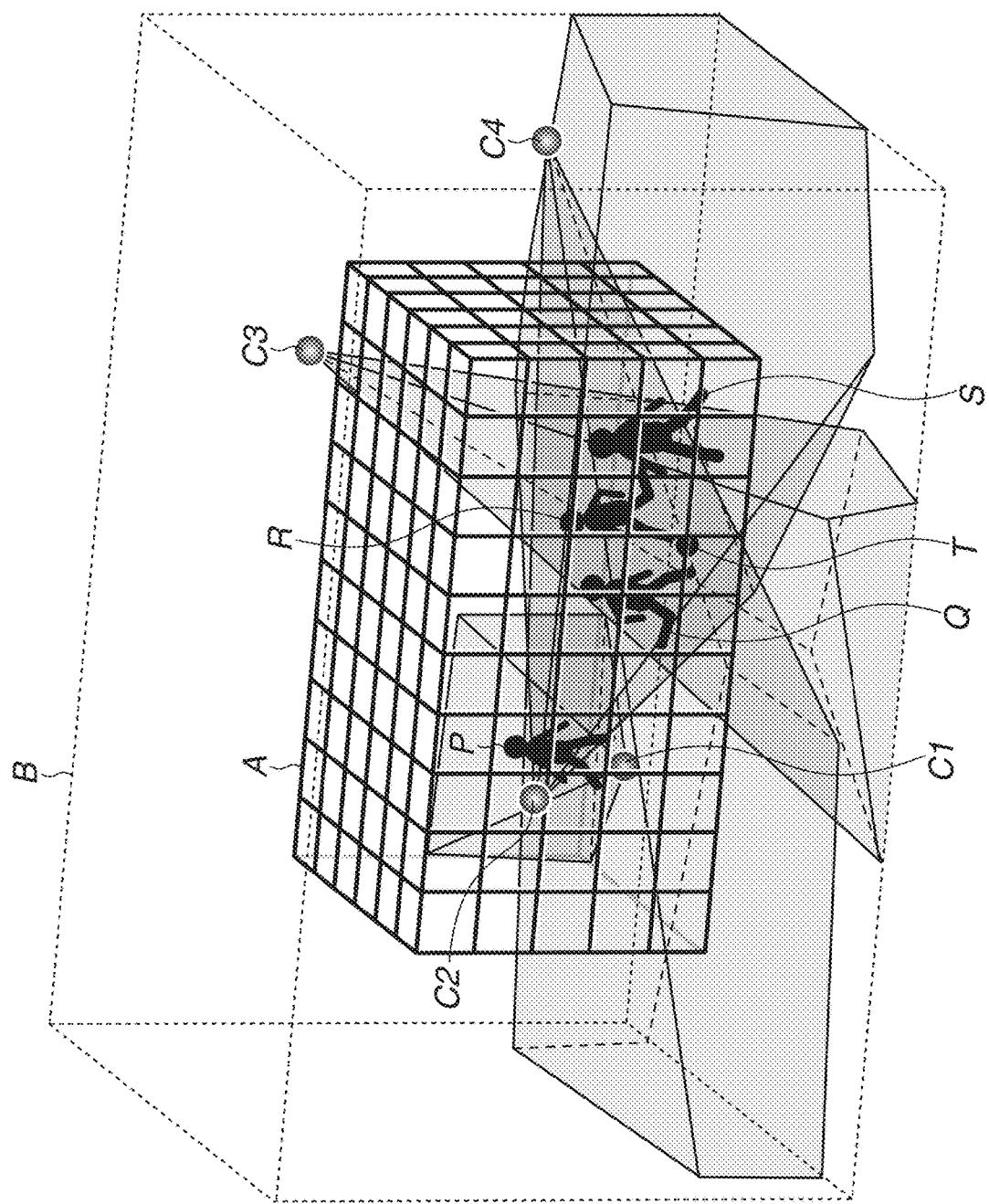
FIG. 2 illustrates an example of virtual camera visualization information.
Figure 3:
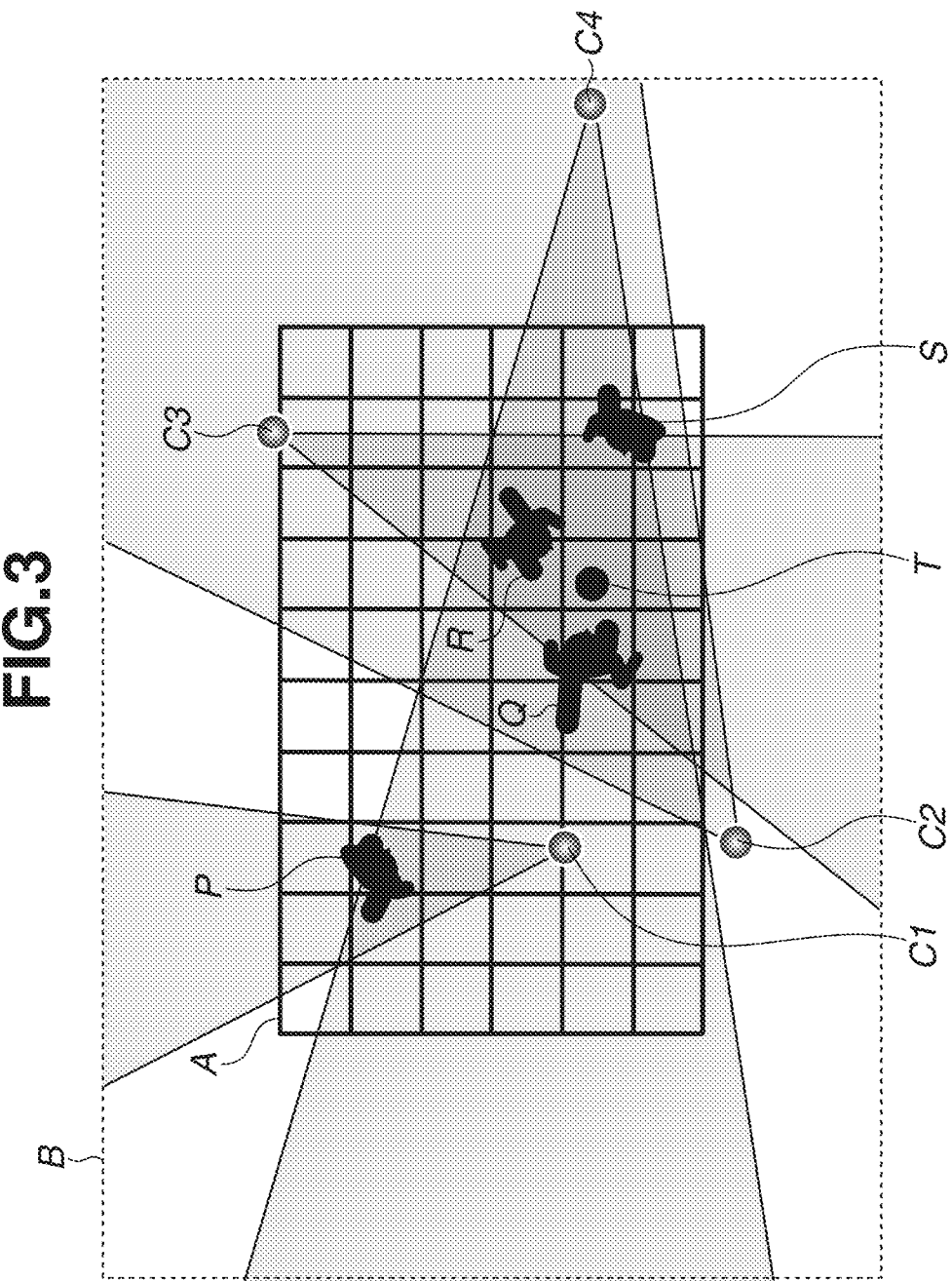
FIG. 3 illustrates another example of the virtual camera visualization information.

The processing for generating the virtual camera visualization information performed by the visualization information generation unit 304 in step S1306 will be described below with reference to a specific example. FIG. 2 illustrates an example of the virtual camera visualization information generated by the visualization information generation unit 304. FIGS. 2 and 3 illustrate examples of the virtual camera visualization information showing the position and field of view of virtual cameras C1 to C4 (Cu where u=1 to 4) separately set by four different users (user ID=u=1 to 4) in a scene including an imaging target. Referring to FIGS. 2 and 3, the virtual camera visualization information displays computer graphics (CG) representing the field and stadium as imaging target areas and objects representing the virtual cameras C1 to C4 at corresponding positions on the virtual viewpoint image. Referring to FIGS. 2 and 3, an area A indicates an area for generating target object visualization information (described below). When the imaging target is a ball game such as soccer, the area A may be set as a three-dimensional space having a height of the range where a ball can fly up from the field surface. The area A is divided into a predetermined number of blocks in each of the X, Y, and Z directions in the three-dimensional coordinates. In the following descriptions, a division block refers to each of blocks formed by dividing the area A, Information B indicates a range where virtual cameras can be set. Foreground objects P, Q, R, 5, and T indicate players and a ball.

The virtual camera visualization information illustrated in FIGS. 2 and 3 may be generated by superimposing an object indicating a virtual camera on a virtual viewpoint image. The position of a viewpoint related to the virtual viewpoint image on which the virtual camera visualization information is to be superimposed may be arbitrarily changed on the user terminal 4. The image processing apparatus 3 may also determine the position of a viewpoint of a virtual viewpoint image included in the virtual camera visualization information based on the position of a viewpoint related to a virtual viewpoint image displayed by the user terminal 4. For example, the image processing apparatus 3 may match the line-of-sight direction of a virtual viewpoint image displayed by the user terminal 4 with the light-of-sight direction of a virtual viewpoint image included in the virtual camera visualization information. This makes it easier to grasp the positional relationship between the virtual viewpoint image displayed by the user terminal 4 and the virtual camera visualization information. The image processing apparatus 3 may set the position of a viewpoint of a virtual viewpoint image included in the virtual camera visualization information to a position on the field separated from the position of a viewpoint related to a virtual viewpoint image displayed by the user terminal 4. This setting allows the user to look down on the positions of virtual cameras of other users to grasp camera positions.

FIG. 3 illustrates the virtual camera visualization information illustrated in FIG. 2 which is looked down on from above. As illustrated in FIGS. 2 and 3, to allow the user to look down on the positions of virtual cameras to grasp camera positions, it may be possible to set as a viewpoint position a range wider than the range where virtual camera positions can be set in the virtual camera visualization information.

The display form of the virtual camera visualization information may be arbitrarily selected from a plurality of display forms including the examples illustrated in FIGS. 2 and 3. The user terminal 4 may also simultaneously display as the virtual camera visualization information a plurality of display forms including the examples illustrated in FIGS. 2 and 3. The user terminal 4 may also display the positions of the virtual cameras C1 to C4 by using camera-like objects.

The virtual camera visualization information illustrated in FIGS. 2 and 3 is only as examples. The virtual camera visualization information may include other information or may not include part of the information illustrated in FIGS. 2 and 3. For example, in association with a virtual camera, the virtual camera visualization information may include the user ID as identification information for identifying the user who set the virtual camera. The virtual camera visualization information displayed on the user terminal 4 may not include information indicating the area A or B. The user terminal 4 may display or hide part of the virtual camera visualization information illustrated in FIGS. 2 and 3 in response to a user's operation. The user terminal may display or hide, for example, information indicating the fields of view of the virtual cameras C1 to C4 in response to a user's operation. The user terminal 4 may display the virtual camera visualization information illustrated in FIGS. 2 and 3 together with the virtual viewpoint image.

The target object visualization information as an example of the virtual camera visualization information will be described below. The target object visualization information according to the present exemplary embodiment is an image displayed on the display unit of the user terminal 4 used by a certain user, i.e., an example of information indicating target objects (virtual viewing targets) included in the fields of view of virtual viewpoints specified by other users, in an identifiable manner. A flow of processing for generating the target object visualization information will be described below with reference to the flowchart illustrated in FIG. 4.

In step S1001, the image processing apparatus 3 acquires from the storage unit 303 the foreground coordinates indicating the coordinates of the foreground object included in the field of view of the virtual camera C1. In step S1002, the image processing apparatus 3 determines whether a division block includes the foreground coordinates. When the image processing apparatus 3 determines that the division block includes the foreground coordinates (YES in step S1002), then in step S1003, the image processing apparatus 3 increments the count N (initial value is 0) supplied to the division block by 1. In step S1005, the image processing apparatus 3 increments the variable for identifying a virtual camera. Further, the image processing apparatus 3 performs the count processing in step S1003 for the following virtual camera. In step S1004, the image processing apparatus 3 continues the processing in step S1003 until the count processing is completed for all of the virtual cameras. FIGS. 5A and 5B illustrate examples of results of the count processing in the scenes illustrated in FIGS. 2 and 3, respectively. FIG. 5A illustrates information indicating the count value simplified from the top surface side. This count value indicates the degree of attention of a division block as an object targeted by each virtual camera.

When the image processing apparatus 3 determines that the count processing is completed for all of the virtual cameras (YES in step S1004), then in step S1006, the image processing apparatus 3 determines the display color of each division block corresponding to the count. The image processing apparatus 3 may determine the display color of each division block in the same procedure as a color heat map. The image processing apparatus 3 may determine the display color according to a predetermined classification rule: red for the division block having the largest count, blue for the division block having the smallest count, and orange, yellow, and green for division blocks having intermediate counts in this order from the red side, for example. These colors are only examples, and different colors may be used. The count N=0 may correspond to colorless, and the count may be represented by different shades of a single hue or different textures. In addition, to smooth the boundaries between colors if the display colors of all division blocks are determined, the image processing apparatus 3 may perform boundary processing such that rectangular boundary lines of division blocks are ignored. The image processing apparatus 3 may also perform the boundary processing such that boundaries match with contour lines of the foreground object in the division blocks.

The image processing apparatus 3 may display in the division block as the target object visualization information the count number in numerical text form as it is. The image processing apparatus 3 may also display a moving image graphic in each division block as the target object visualization information and may indicate the count number by the intensity of motion. In addition, a plurality of the representation methods may be combined. The image processing apparatus 3 may make the target object visualization information translucent to maintain the visibility of other information. In the above descriptions, the count number in division blocks included in the entire field of view of a virtual camera is increased in step S1001. However, processing is not limited thereto. The count number in division blocks included in a part of the field of view of a virtual camera (for example, a part including the center of the field of view) be increased. Further, how much the count of division blocks is increased may be determined according to a part of the field of view of the virtual camera in which the division block is included.

An example display of the target object visualization information is illustrated in FIG. 5B. Referring to FIG. 5B, the image processing apparatus 3 represents the count by the density of texture to smoothly correct the boundaries between textures. In the above-described example, the image processing apparatus 3 displays the target object visualization information for emphasizing objects projected onto the virtual viewpoint image according to a user-set viewpoint by using colors and moving images. In addition, in the above-described example, the image processing apparatus 3 displays colors and moving images according to the number of users who set virtual viewpoint images onto which objects are projected. Displaying such target object visualization information allows the user to easily recognize the portion to which a larger number of virtual cameras are oriented and the object on which each user focuses attention. An example display of the target object visualization information is not limited thereto. For example, icons and text information may be used. Although, in the above-described example, information indicating division blocks in an identifiable manner as target objects included in the field of view of virtual cameras are generated, target objects are not limited to division blocks. For example, the image processing apparatus 3 may determine which person is included in the field of view of each virtual camera and generate information indicating a person in an identifiable manner as a target object included in the field of view of the virtual camera. For example, the image processing apparatus 3 may determine which portion of a person is included in the field of view of each virtual camera and generate information indicating the portion of the person in an identifiable manner as a target object included in the field of view of the virtual camera.

(Recommendation Processing Based on Virtual Camera Visualization Information)

Figure 7:
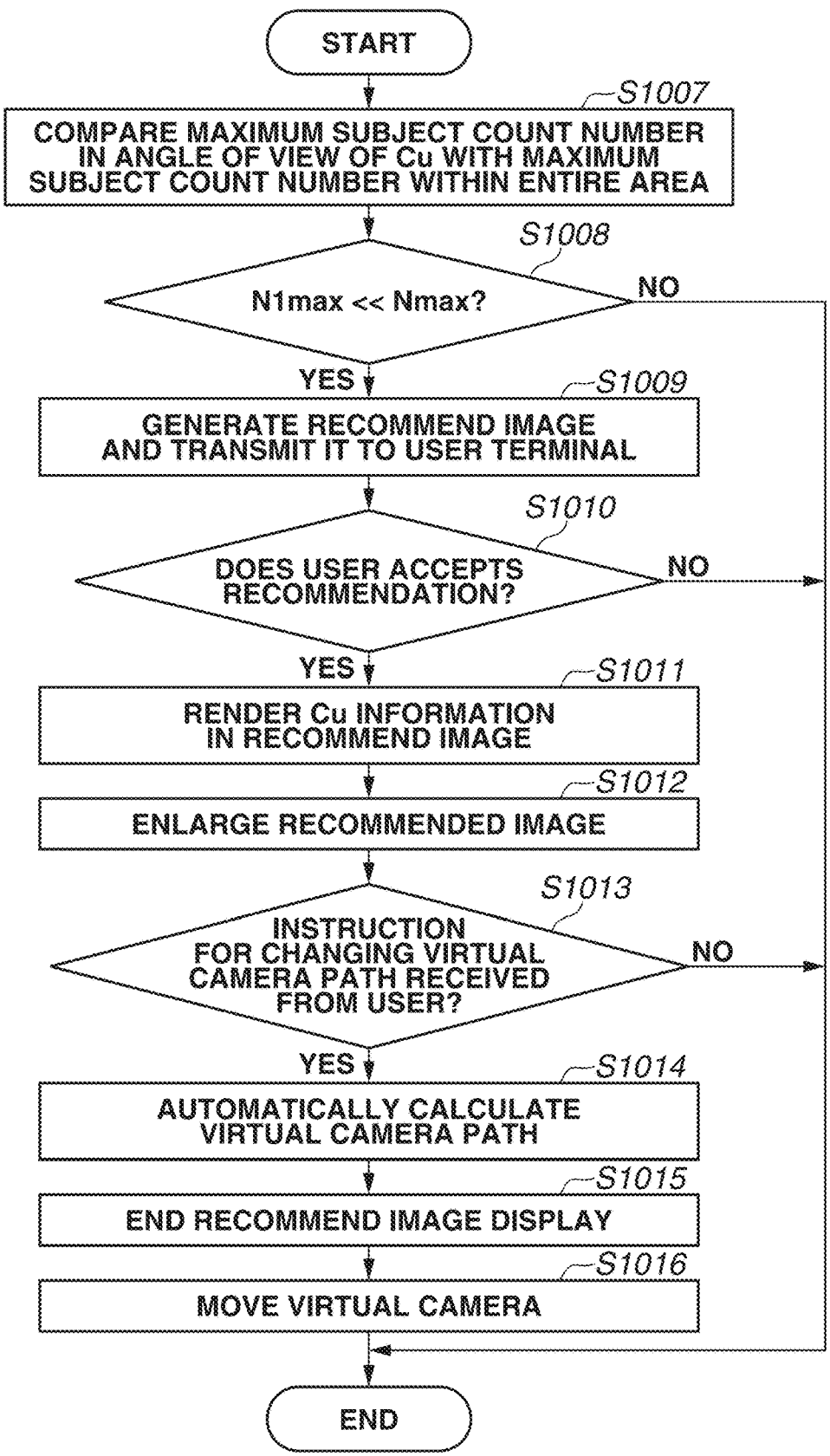
FIG. 7 is a flowchart illustrating a flow of recommendation processing.

A flow of recommendation processing based on the virtual camera visualization information will be described below with reference to the flowchart illustrated in FIG. 7. The recommendation processing based on the virtual camera visualization information is processing for notifying a user who is viewing an area different from an area being viewed by many users, of the area captured by a larger number of other virtual cameras as recommendation information. The recommendation processing is also processing for moving, upon reception of a request from the user, a virtual camera to the area captured by a larger number of other virtual cameras, i.e., the area on which many users focus attention.

Figure 4:
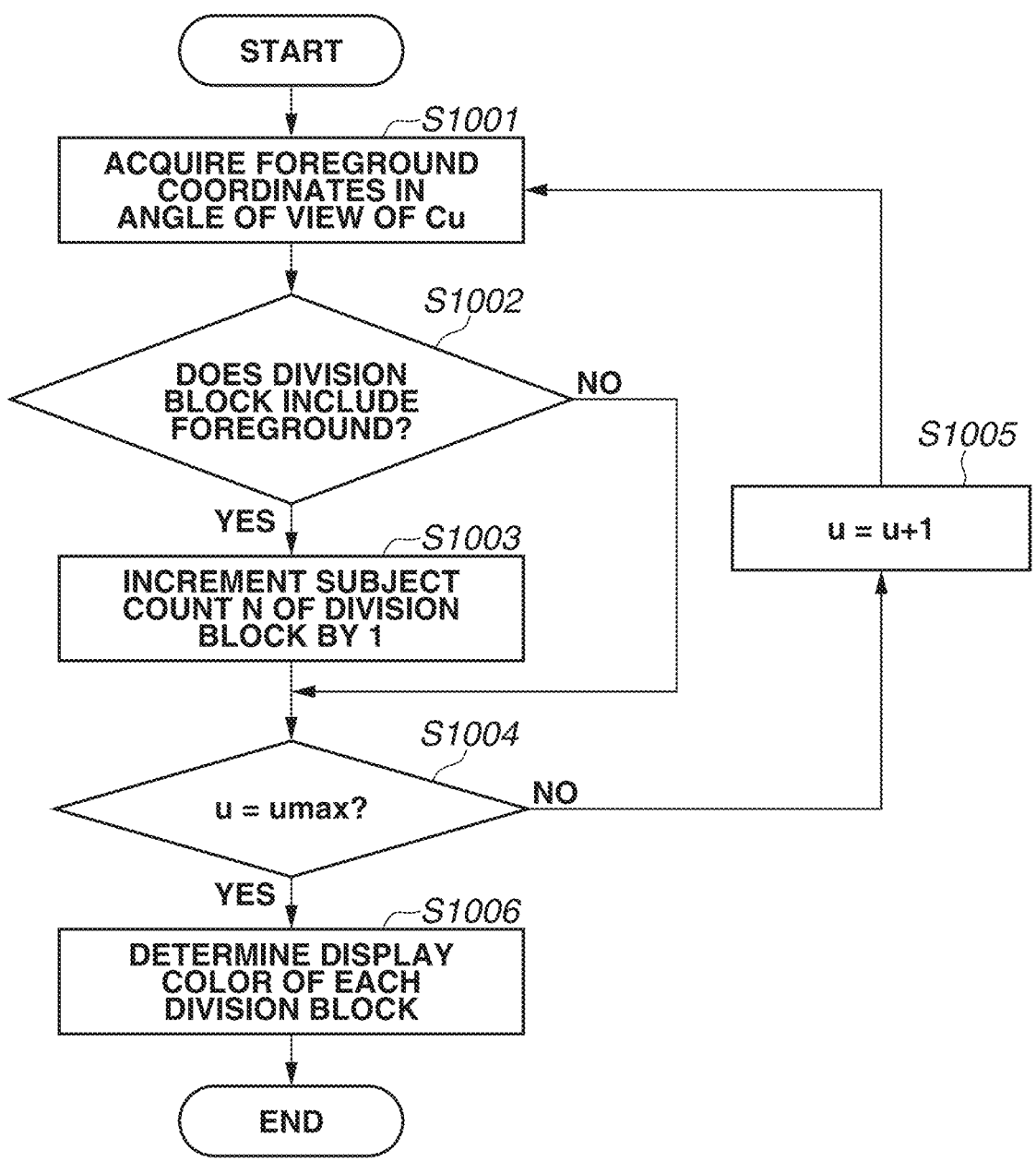
FIG. 4 is a flowchart illustrating a flow of processing for generating the virtual camera visualization information.

In step S1007, the image processing apparatus 3 compares the viewing number (N1max corresponding to the count value in the processing illustrated in FIG. 4) of all users of the foreground object within the angle of view of the virtual camera of the user subjected to processing, with the maximum count (Nmax) in the entire area A. When the result of the comparison in step S1007 is N1max<<Nmax (YES in step S1008), then in step S1009, the image processing apparatus 3 generates a recommend image and transmits the generated recommend image to the user terminal 4. A criterion for determining whether N1max is sufficiently smaller than Nmax is arbitrarily predetermined. For example, the image processing apparatus 3 determines whether N1max is equal to or smaller than a fixed ratio of Nmax. Since the number of users is 4, in the example illustrated in FIG. 2, the following description will be made on the premise that N1max<<Nmax although the difference between N1max and Nmax is small.

Figure 6A:
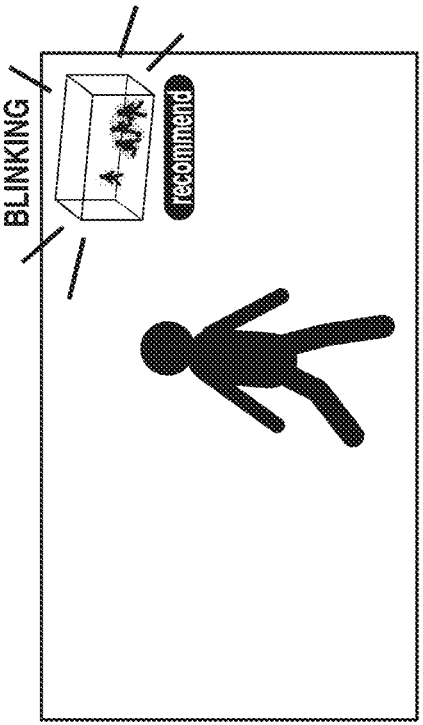
FIGS. 6A to 6D illustrate examples of display screens of a user terminal.
Figure 6B:

The user terminal 4 displays the recommend image received from the image processing apparatus 3. The recommend image is an example of information indicating in an identifiable manner a target object included within the field of view of a virtual camera specified by a user who is different from the user of the user terminal 4. An example display of a recommend image will be described below with reference to FIGS. 6A to 6D. FIG. 6A illustrates an example screen of the display unit 402 of the user terminal 4a which displays a virtual viewpoint image. Referring to FIG. 6A, the screen displays a virtual viewpoint image (an image of the virtual camera C1) based on a virtual camera path specified by the user 1 of the user terminal 4a. When the image processing apparatus 3 performs the processing in step S1007 on the user terminal 4a displaying the virtual viewpoint image illustrated in FIG. 6A, the image processing apparatus 3 determines that N1max<<Nmax. More specifically, the image processing apparatus 3 determines that the number of all the users viewing the objects projected onto the virtual viewpoint image displayed on the user terminal 4a is extremely smaller than the viewing number of the object shot by the largest number of other user terminals. Accordingly, the image processing apparatus 3 generates the recommend image for the user terminal 4a and transmits the recommend image to the user terminal 4a. FIG. 6B illustrates an example of the recommend image generated by the display image generation unit 305 of the image processing apparatus 3 and displayed on the user terminal 4. Referring to FIG. 6B, the recommend image is superimposed on the virtual viewpoint image displayed on the user terminal 4a, Referring to FIG. 6B, a graphic indicating the count number of the area A and a title text "recommend" are displayed in an area at the top right of the virtual viewpoint image. The user terminal 4 may display the recommend image in a blinking state to draw the attention of the user 1. In this case, the recommend image may be displayed as a three-dimensional perspective view illustrating the contour of the area A with a wire frame. The perspective direction of the recommend image may be close to the line-of-sight direction of the virtual camera C1 to make it easier for the user 1 to grasp the positional relation with the virtual camera C1 currently being viewed by the user 1. In addition, the recommend image may be the virtual viewpoint image viewed from the perspective direction with information superimposed thereon.

In step S1010, the image processing apparatus 3 determines whether the user terminal 4 changes the virtual camera position based on the recommend image. The image processing apparatus 3 determines whether a request for changing the virtual camera position based on the recommend image is received from the user terminal 4. When a tap, selection determination, or other predetermined instructing operation is performed on the recommend image, the user terminal 4 transmits a request for changing the virtual camera position based on the recommend image to the image processing apparatus 3.

When the image processing apparatus 3 determines that the user terminal 4 changes the virtual camera position based on the recommend image (YES in step S1010), the visualization information generation unit 304 of the image processing apparatus 3 acquires the current virtual camera position of the user terminal 4 which is a processing target. In step S1011, the image processing apparatus 3 render the information indicating the current virtual camera position on the recommend image. To allow the user 1 to recognize the current virtual camera position, the image processing apparatus 3 generates rendering information which shows the position of the viewpoint of the virtual camera C1. Referring to FIGS. 6A to 6D, based on the rendering information from the image processing apparatus 3, the user terminal 4a blinks the foreground object captured by the virtual camera C1 together with a text "Your View" as information indicating the position of the viewpoint of the virtual camera C1. In step S1012, the image processing apparatus 3 transmits information for enlarging the recommend image to the user terminal 4.

Figure 6C:
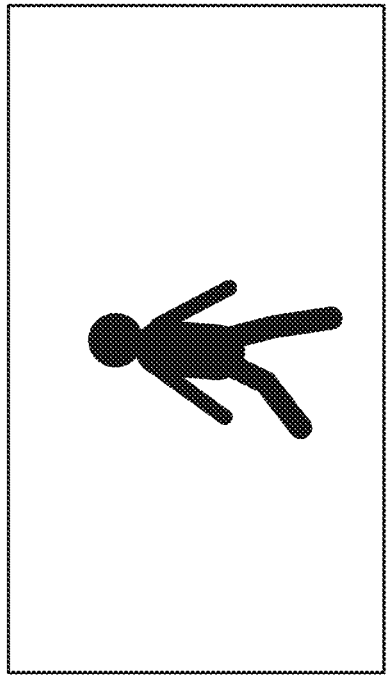

FIG. 6C illustrates an example display of an enlarged recommend image on the user terminal 4a. Referring to FIG. 6C, the foreground object captured by the virtual camera C1 (information indicating the position of the viewpoint of the virtual camera C1) is represented by a striped pattern. The information indicating the position of the viewpoint of the virtual camera C1 may be displayed in a blinking state, or in a state where the color of the foreground object captured by the virtual camera C1 is changed or the foreground object captured by the virtual camera C1 is surrounded by a circular or rectangular curve. The information indicating the position of the viewpoint of the virtual camera C1 may be information showing the current position of the virtual camera C1 in diverse ways, for example, by displaying a graphic such as a circle and camera icon at the position of the virtual camera C1. The image displayed on the user terminal 4a may be provided with object identification information. Examples of the object identification information include the name of the person corresponding to the foreground object captured by the virtual camera C1, and the name of the person corresponding to the target object included in the field of view of other virtual cameras. The object identification information is not limited to a person's name and may be, for example, the ID assigned to a person and the name of a target portion of a person.

In step S1013, the image processing apparatus 3 determines whether an instruction for changing the virtual camera path is received from the user terminal 4. When a tap, selection determination, or other predetermined instructing operation is performed on an area with a large count number in the recommend image, the user terminal 4 transmits an instruction for changing the virtual camera path to the image processing apparatus 3. When an instruction for changing the virtual camera path is received (YES in step S1013), then in step S1014, the acquisition unit 302 of the image processing apparatus 3 automatically calculates a virtual camera path along which the virtual camera C1 is moved up to the position where a selected area is shot, and acquires the parameters of the virtual camera path. The image processing apparatus 3 may automatically calculate a virtual camera path so as to translate the virtual camera C1 without changing a zoom factor of the virtual camera. In step S1014, the image processing apparatus 3 may calculate a virtual camera path along which the virtual camera C1 is moved from the current position to the recommend position. The movement of the virtual camera C1 is shot in a virtual viewpoint image to make it easier for the user to keep correct recognition of the virtual camera position. The image processing apparatus 3 may also calculate a virtual camera path along which a selected area is shot while rotating the line-of-sight direction with the current virtual camera position fixed. The image processing apparatus 3 may also calculate a virtual camera path along which, instead of moving the virtual camera from the current position to the position where the selected area is captured, the virtual camera position is switched from the current position to that position. The user terminal 4 may also be configured to automatically calculate a virtual camera path. The image processing apparatus 3 or the user terminal 4 may select a virtual camera specified in the virtual camera visualization information and determine the position of the selected virtual camera as a viewpoint for a virtual viewpoint image to be generated.

Figure 6D:
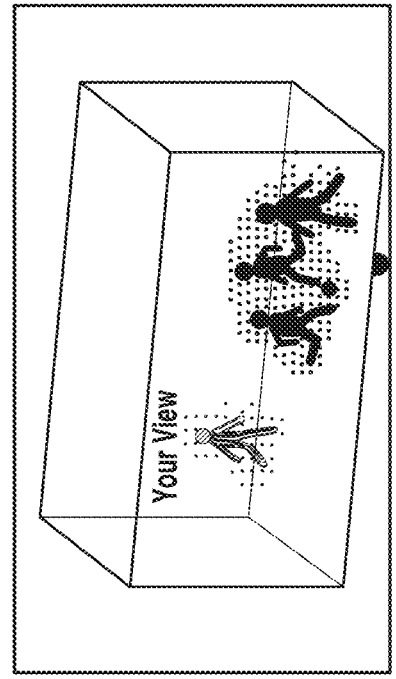

In step S1015, the image processing apparatus 3 transmits an instruction for ending display of the recommend image to the user terminal 4. The user terminal 4 ends display of the recommend image. In step S1016, the image processing apparatus 3 generates a virtual viewpoint image according to the virtual camera path calculated in step S1014, and the virtual camera is moved. FIG. 6D illustrates an example of a virtual viewpoint image to be displayed on the user terminal 4 after moving the virtual camera based on the recommend image.

Through the above-described recommendation processing based on the virtual camera visualization information, the user comes to know the existence of an area on which many other users focus attention. If the user wants to view the area, he can orient or move a virtual camera to the area. In the examples illustrated in FIGS. 6A to 6D, while the user selects an area with a large count, the user may select an area with a small count or the like to arbitrarily select an area to which a virtual camera is moved. Although, in the processing illustrated in FIG. 7, the recommend image is automatically displayed when N1max<<Nmax, the recommend image may be automatically displayed in response to an instructing operation performed by the user at arbitrary timing.

Figure 8:
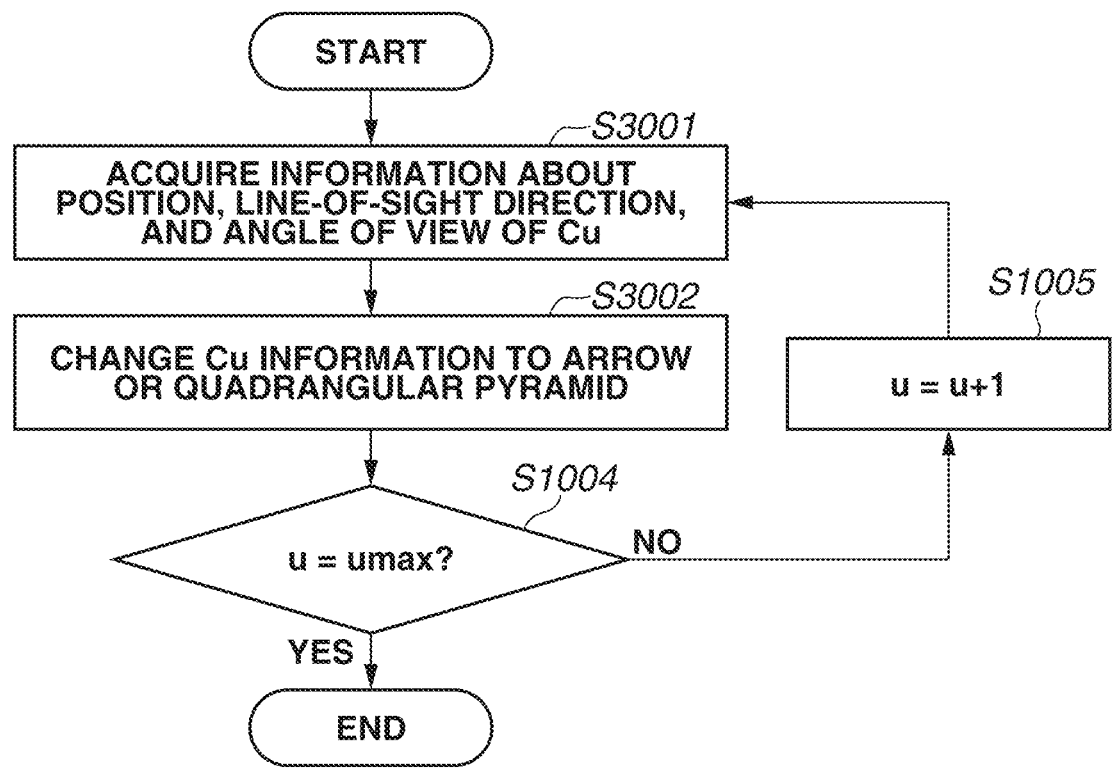
FIG. 8 is another flowchart illustrating a flow of processing for generating the virtual camera visualization information.

A modification of the virtual camera visualization information will be described below. A modification of processing for generating the virtual camera visualization information will be described below with reference to the flowchart illustrated in FIG. 8. In the processing illustrated in FIG. 8, the image processing apparatus 3 generates visualization information showing each virtual camera as an arrow or quadrangular pyramid.

Figure 9:
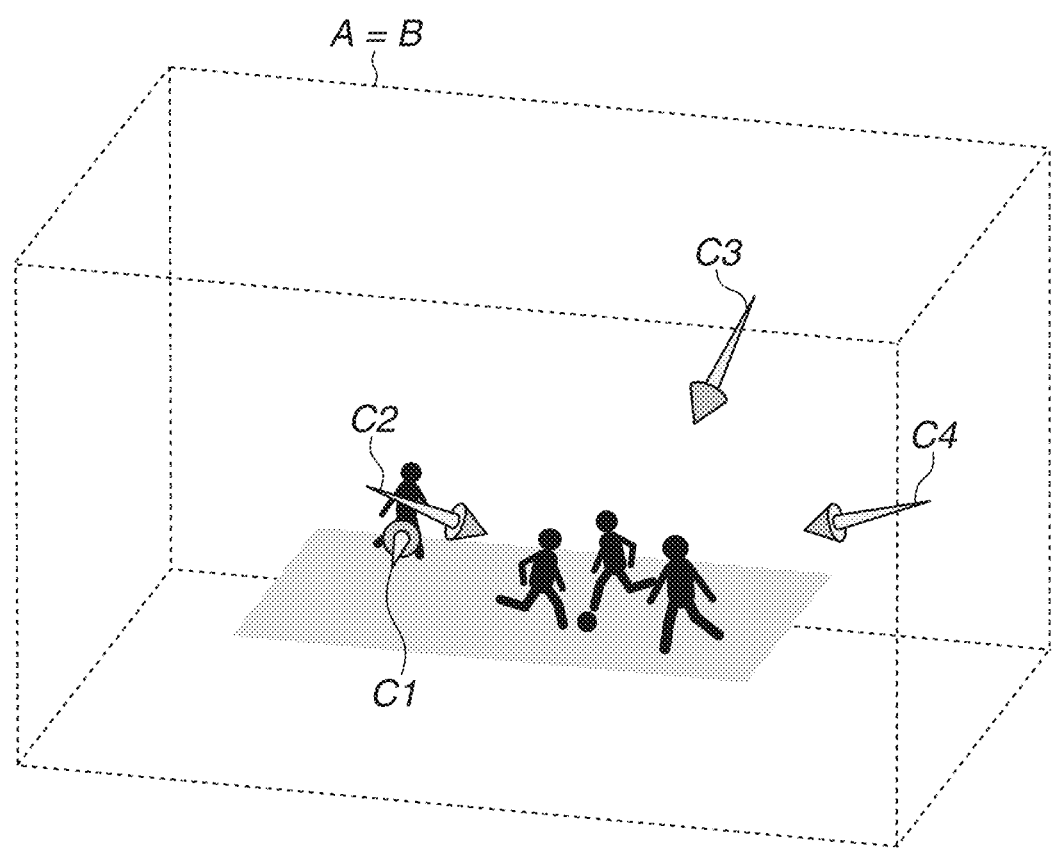
FIG. 9 illustrates a still another example of the virtual camera visualization information.

In step S3001, the visualization information generation unit 304 of the image processing apparatus 3 acquires information about the position, line-of-sight direction, and angle of view of a virtual camera Cu from the storage unit 303. In step S3002, the visualization information generation unit 304 of the image processing apparatus 3 changes the information of the virtual camera Cu to an arrow or quadrangular pyramid. When changing the information indicating the virtual camera to an arrow, the image processing apparatus 3 sets the position coordinates of the virtual camera Cu as the starting point coordinates of the arrow, and sets the line-of-sight direction of the virtual camera Cu as the orientation of the arrow. The length of the arrow from the starting point is a fixed length. FIG. 9 illustrates an example where an arrow is used as information for visualizing a virtual camera. Referring to FIG. 9, arrows are rendered not as lines but in three-dimensional form. In the example illustrated in FIG. 9, the area A as a range where virtual camera information is visualized coincides with an area B (a range where virtual cameras can be set).

Figure 10:
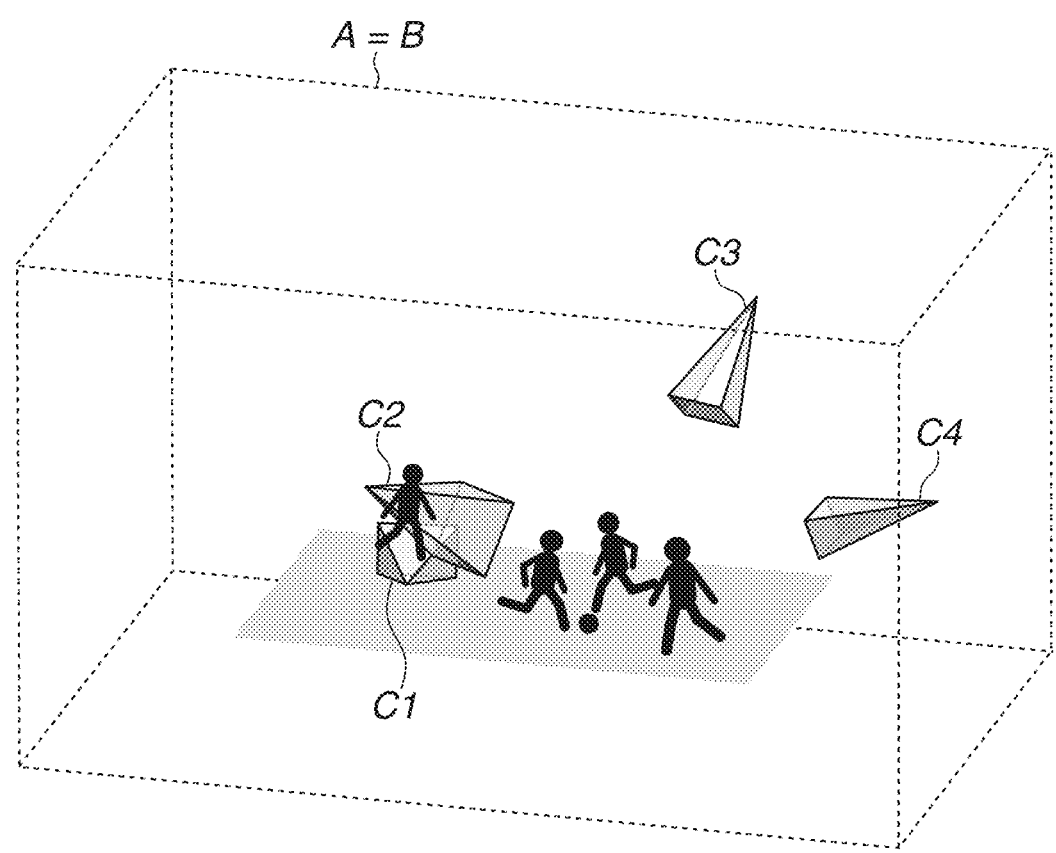
FIG. 10 illustrates a still another example of the virtual camera visualization information.

When information indicating a virtual camera is represented as the quadrangular pyramid, the image processing apparatus 3 sets the position coordinate of the virtual camera Cu as the vertex coordinates, sets the line-of-sight direction of the virtual camera Cu as the orientation from the vertex to the central point of the base end surface, and sets the horizontal and vertical angles of view of the virtual camera Cu as the angles between two pairs of facing triangular lateral surfaces, respectively. The distance from the vertex to the base end surface of the quadrangular pyramid is a fixed length from the vertex. FIG. 10 illustrates an example where a quadrangular pyramid is used as information for visualizing a virtual camera. FIG. 10 illustrates all ridgelines of each quadrangular pyramid. However, to represent a state where the field of view spreads to infinity, the quadrangular pyramid may be illustrated in gradation starting from the vertex so that the base end surface disappears. Further, the quadrangular pyramid may extend up to the boundary of the area A.

In addition to the information illustrated in FIG. 9 or 10, the information generated in step S1006 may be added to the foreground object. The information indicating a virtual camera is not limited to the above-described example. Other information including other icons, text information, and symbols may be used.

According to the above-described exemplary embodiment, it is possible to directly show the position where each virtual camera exists, the direction to which the virtual camera is oriented, the type (wide-angle or zoom) of the virtual camera, and the angle of view of the virtual camera. In addition, the virtual camera visualization information may be represented by a combination of arbitrary visualization techniques including a count number in graphical form and an arrow or quadrangular pyramid representing a virtual camera itself. For example, by displaying the count in graphical form and the quadrangular pyramid, the user comes to know where a target area is, the direction from which the area is focused, and the angle of view with which the area is focused.

When generating the virtual camera visualization information, the visualization information generation unit 304 may categorize users based on the user information acquired from the management unit 306 and generate visualization information for each user category. Examples of user categories are the age, gender, hometown, and current resident address. Moreover, various categories are conceivable such as the experience data and favorite team about a specific sport, and experience data on virtual camera operations. When displaying a visualization result for each user category, display may be simply changed for each category. Alternatively, when simultaneously displaying all categories, display may be differentiated by color and texture. Further, the user category name itself may be displayed as a text near the information indicating a virtual camera. More specifically, the visualization information generation unit 304 does not need to generate information indicating the virtual camera positions for all users stored in the storage unit 303. The visualization information generation unit 304 may generate the virtual camera visualization information related to one user or a part of users.

Although, in the above-described exemplary embodiment, the virtual camera information of a plurality of users simultaneously existing at a certain time is visualized, the visualization information generation unit 304 may generate and display, for example, the virtual camera visualization information indicating an area which has been often viewed by a user through entire one game. The virtual camera information may be accumulated in the successive temporal direction and visualized also for a plurality of users. In this case, in the above-described recommendation processing, the user terminal 4a may display the virtual camera visualization information related to a second virtual viewpoint previously set by the user when, for example, the user terminal 4a is displaying a first virtual viewpoint image based on a first virtual viewpoint set by a user a of the user terminal 4a.

According to the above-described exemplary embodiment, it is possible to calculate and graphically display a count number and show a virtual camera as an arrow or quadrangular pyramid, which makes it easier for the user to grasp an area on which other users focus attention. In addition, the user is able to move a virtual camera to an arbitrary position while referring to the positions of virtual cameras of other users. The user is also able to move his or her own virtual camera to one of the positions of virtual cameras of other users.

While, in the above descriptions, the image processing apparatus 3 is configured to generate the virtual camera visualization information, the information may be generated by the user terminal 4. In this case, the image processing apparatus 3 may transmit information such as the coordinates information of the virtual cameras stored in the storage unit 303 to the user terminal 4, and the user terminal 4 may generate the virtual camera visualization information based on the received information.

While, in the above-described recommendation processing, an area shot by a larger number of other virtual cameras is recommended to a user who is viewing an area different from areas being viewed by many users, the recommendation processing is not limited thereto. For example, the user terminal 4 may display the virtual camera visualization information for notifying a user who is viewing the same area as other users that other users are also shooting the same area by using virtual cameras. More specifically, the image processing apparatus 3 may notify the user terminal 4a displaying the first virtual viewpoint image based on the first virtual viewpoint set by the user a, of the virtual camera visualization information related to the second virtual viewpoint (the same position as the first virtual viewpoint) set by the user b in the user terminal 4b.

While the present disclosure has specifically been described in detail based on the above-described exemplary embodiment, the present disclosure is not limited thereto but can be modified in diverse ways within the ambit of the appended claims. The above-described exemplary embodiment, for example, allows a user to easily recognize information about a virtual viewpoint of a virtual viewpoint image currently being viewed by other users.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Btu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-206013, filed Oct. 25, 2017, which is hereby incorporated by reference herein in its entirety.

What is claimed is:

1. An information processing apparatus, comprising:
one or more hardware processors; and
one or more memories which store instructions executable by the one or more hardware processors to cause the information processing apparatus to perform at least:
specifying a first virtual viewpoint corresponding to a first virtual viewpoint image to be generated based on captured images of an imaging target area captured by a plurality of imaging apparatuses at different positions;
specifying a target object included in a field of view of a second virtual viewpoint corresponding to a second virtual viewpoint image to be generated based on the captured images; and
causing a display apparatus to display the first virtual viewpoint image corresponding to the specified first virtual viewpoint with information for specifying whether an object in the first virtual viewpoint image is the specified target object included in the field of view of the second virtual viewpoint and for specifying at least one of a position of the second virtual viewpoint, a direction of view from the second virtual viewpoint and an angle of view of the second virtual viewpoint.

2. The information processing apparatus according to claim 1, wherein the display apparatus is caused to display the target object with a color distinguishable from colors of other objects.

3. The information processing apparatus according to claim 1, wherein the display apparatus is caused to display the target object by a moving image such that the target object is distinguishable from other objects.

4. The information processing apparatus according to claim 1, wherein the display apparatus is caused to display information indicating a degree of attention according to the number of virtual viewpoints which include the target object in respective fields of view.

5. The information processing apparatus according to claim 4, wherein the display apparatus is caused to display the target object by using at least one of a color according to the degree of attention and a moving image according to the degree of attention.

6. The information processing apparatus according to claim 1, wherein the display apparatus is caused to display information indicating an area where the target object is positioned.

7. The information processing apparatus according to claim 1, wherein the display apparatus is caused to display information for identifying the target object.

8. The information processing apparatus according to claim 1, wherein the display apparatus is caused to display the information on the first virtual viewpoint image.

9. The information processing apparatus according to claim 1, wherein an object included in a predetermined part of the field of view of the second virtual viewpoint is specified as the target object.

10. The information processing apparatus according to claim 9, wherein the predetermined part of the field of view of the second virtual viewpoint includes a center of the field of view of the second virtual viewpoint.

11. The information processing apparatus according to claim 1, wherein a user designating the first virtual viewpoint is different from a user designating the second virtual viewpoint.

12. The information processing apparatus according to claim 1, wherein an object included in each of fields of view of a plurality of virtual viewpoints different from the first virtual viewpoint is specified as the target object.

13. The information processing apparatus according to claim 1, wherein the display apparatus is further caused to display the second virtual viewpoint image in response to an operation on an image including the information displayed by the display apparatus.

14. The information processing apparatus according to claim 1, wherein the target object is a person or a part of a person positioned in the imaging target area.

15. An information processing method comprising:
specifying a first virtual viewpoint corresponding to a first virtual viewpoint image to be generated based on captured images of an imaging target area captured by a plurality of imaging apparatuses at different positions;
specifying a target object included in a field of view of a second virtual viewpoint corresponding to a second virtual viewpoint image to be generated based on the captured images; and
causing a display apparatus to display the first virtual viewpoint image corresponding to the specified first virtual viewpoint with information for specifying whether an object in the first virtual viewpoint image is the specified target object included in the field of view of the second virtual viewpoint and for specifying at least one of a position of the second virtual viewpoint, a direction of view from the second virtual viewpoint and an angle of view of the second virtual viewpoint.

16. The information processing method according to claim 15, wherein, the display apparatus is caused to display the target object with at least one of a color distinguishable from colors of other objects.

17. The information processing method according to claim 15, wherein, the display apparatus is caused to display information indicating a degree of attention according to the number of virtual viewpoints which include the target object in respective fields of view is displayed.

18. A non-transitory storage medium storing a program for causing a computer to execute an information processing method, the information processing method comprising:
specifying a first virtual viewpoint corresponding to a first virtual viewpoint image to be generated based on captured images of an imaging target area captured by a plurality of imaging apparatuses at different positions;
specifying a target object included in a field of view of a second virtual viewpoint corresponding to a second virtual viewpoint image to be generated based on the captured images; and
causing a display apparatus- to display the first virtual viewpoint image corresponding to the specified first virtual viewpoint with information for specifying whether an, object in the first virtual viewpoint image is the specified target object included in the field of view of the second virtual viewpoint and for specifying at least one of a position of the second virtual viewpoint, a direction of view from the second virtual viewpoint and an angle of view of the second virtual viewpoint.

19. The information processing apparatus according to claim 1, wherein the display apparatus is caused to display first information indicating whether an object in the first virtual viewpoint image is the specified target object included in the field of view of the second virtual viewpoint and second information, which is different from the first information, indicating at least one of a position of the second virtual viewpoint, a direction of view from the second virtual viewpoint and an angle of view of the second virtual viewpoint.

20. The information processing apparatus according to claim 1, wherein the display apparatus is caused to display one piece of information indicating whether an object in the first virtual viewpoint image is the specified target object included in the field of view of the second virtual viewpoint and indicating at least one of a position of the second virtual viewpoint, a direction of view from the second virtual viewpoint and an angle of view of the second virtual viewpoint.

* * * * *